United States Patent
Wells et al.

(10) Patent No.: US 12,092,256 B2
(45) Date of Patent: Sep. 17, 2024

(54) PRESSURIZED PUSH ROD SYSTEM AND DEVICE

(71) Applicant: CTG Sales LLC, Bluffdale, UT (US)

(72) Inventors: Colby Wells, Bluffdale, UT (US); Trevor Wells, Bluffdale, UT (US)

(73) Assignee: CTG SALES, LLC, Bluffdale, UT (US)

( * ) Notice: Subject to any disclaimer, the term of this patent is extended or adjusted under 35 U.S.C. 154(b) by 723 days.

(21) Appl. No.: 16/219,658

(22) Filed: Dec. 13, 2018

(65) Prior Publication Data
US 2019/0178431 A1 Jun. 13, 2019

Related U.S. Application Data

(60) Provisional application No. 62/598,403, filed on Dec. 13, 2017.

(51) Int. Cl.
| | |
|---|---|
| *F16L 55/18* | (2006.01) |
| *F16L 55/163* | (2006.01) |
| *F16L 55/165* | (2006.01) |
| *F16L 55/26* | (2006.01) |

(52) U.S. Cl.
CPC .......... *F16L 55/1654* (2013.01); *F16L 55/163* (2013.01); *F16L 55/1653* (2013.01); *F16L 55/18* (2013.01); *F16L 55/26* (2013.01)

(58) Field of Classification Search
CPC ....... F16L 55/1654; F16L 55/18; F16L 55/26; F16L 55/1653; F16L 55/163; F16L 55/10; F16L 55/1116; F16L 55/1141; B60C 29/064
See application file for complete search history.

(56) References Cited

U.S. PATENT DOCUMENTS

| | | | | |
|---|---|---|---|---|
| 1,390,283 A | * | 9/1921 | Edelmann | B60C 29/064 137/231 |
| 1,510,212 A | | 9/1924 | Du Bois | |
| 2,141,033 A | * | 12/1938 | Crowley | B60C 29/064 285/231 |

(Continued)

FOREIGN PATENT DOCUMENTS

| | | | |
|---|---|---|---|
| EP | 0357851 A1 | * | 3/1990 |
| FR | 992204 A | * | 10/1951 |
| WO | 2016/205529 A1 | | 12/2016 |

OTHER PUBLICATIONS

Wood Tools Workshop, Apr. 10, 2016, (the entire video) [online]. YouTube. [retrieved on Feb. 24, 2022]. Retrieved from the Internet: < URL: https://www.youtube.com/watch?v=tUJWKCgvajw>.*

(Continued)

*Primary Examiner* — Zachary T Dragicevich
*Assistant Examiner* — James A Linford
(74) *Attorney, Agent, or Firm* — Travis Banta; Loyal IP Law, PLLC

(57) ABSTRACT

A pressurized push rod system and device for repairing pipe failures from inside the pipe is provided. In one embodiment, a pipe includes a first fitting and a second fitting allowing air to pass through the pipe and into an air bladder. The system includes a pressurized push rod device which attaches to an air bladder and an air compressor to inflate an air bladder within a pipe and thereby apply a patch to a failure within the pipe from inside the pipe.

14 Claims, 4 Drawing Sheets

(56) References Cited

U.S. PATENT DOCUMENTS

| | | | | |
|---|---|---|---|---|
| 2,227,601 A * | 1/1941 | O'Brien, Jr. | ......... | B60C 29/064 |
| | | | | 141/38 |
| 3,119,599 A * | 1/1964 | Tattle | ................. | F16L 55/1654 |
| | | | | 254/134.4 |
| 3,996,967 A * | 12/1976 | Takada | ................... | B29C 49/26 |
| | | | | 138/97 |
| 4,021,265 A | 5/1977 | Guenther | | |
| 5,263,515 A * | 11/1993 | Goodale | .............. | F16L 55/163 |
| | | | | 138/89 |
| 2002/0108671 A1* | 8/2002 | Campbell | ............ | B60C 29/064 |
| | | | | 141/38 |
| 2011/0272055 A1* | 11/2011 | Lepera | ................. | B60C 29/064 |
| | | | | 141/1 |
| 2016/0195202 A1* | 7/2016 | Disbrow | ................ | F16L 11/12 |
| | | | | 138/119 |

OTHER PUBLICATIONS

United States Patent and Trademark Office, "International Search Report", Apr. 4, 2019, International Application No. PCT/US2018/65535.

\* cited by examiner

PRESSURIZED PUSH ROD SYSTEM AND DEVICE

PRIORITY CLAIM

This application claims the benefit of U.S. Provisional Application No. 62/598,403, filed Dec. 13, 2017, which is incorporated herein by reference in its entirety, including but not limited to those portions that specifically appear hereinafter, the incorporation by reference being made with the following exception: In the event that any portion of the above-referenced provisional application is inconsistent with this application, this application supercedes said above-referenced provisional application.

BACKGROUND

1. Technical Field

This disclosure relates to a system and device pushing instruments into piping. More specifically, the disclosed system provides fittings enclosing a length of pipe which allow the pipe to be pressurized to inflate a bladder attached to a pipe. This device includes a rigid but flexible length of pipe which allows air to be transferred from an air source at a first end into an inflatable bladder on the second end.

2. Description of the Related Art

Since the aqueducts of ancient Rome, plumbers have been installing, maintaining, and repairing pipes that bring water to certain fixtures and drain that water away from the fixtures after use. While plumbing technology has improved since the plumbers of ancient Rome made indoor flowing water possible, there are still significant problems with maintaining and repairing pipes. One problem is that pipes, which are frequently buried underground at substantial depth, under cement, or under structures, may rupture, crack, or otherwise break. Because these pipes are buried, they may be difficult and expensive to repair, leaving few options for preventing gases or fluids within the pipes from escaping into the earth surrounding the pipe. It should be noted that many different types of pipes carry all types of fluids and gases between two points. Further, the system and device disclosed herein is suitable for use with any pipe carrying any fluid or gas. However, for the purposes of explanation, the system and device disclosed herein will be discussed with respect to pipes supplying water to a residence or commercial building and pipes draining water away from a residence or commercial buildings. It can be readily appreciated that sewage, for example, leaking from a broken or worn out pipe is a substantial problem, posing both health concerns and environmental concerns.

As previously discussed, accessing pipes buried underground or under structures, or in other places, may be difficult or impossible in various situations, without, for example, demolishing a building and refitting a new section of pipe to repair, for example, a sewer line. Thus, frequently, the only access available to plumbers to repair or maintain a pipe is frequently from inside the pipe. In other words, pipes can be disassembled and disconnected from each other to provide a plumber with access to the inside of the pipe. Frequently pipe repairs that would otherwise be too expensive, difficult, or impossible to repair are fixed by patching or sealing holes, cracks, or other problems from the inside of the pipe.

One conventional solution to fix pipes from the inside of the pipe is shown in FIG. 1. FIG. 1 illustrates a pipe 105. In FIG. 1, pipe 105 may be a conventional sewer pipe of any conventional diameter. Disposed within pipe 105 is a fiberglass rod 110 that is created by attaching short sections of fiberglass rods by screwing a following rod into a leading rod which creates a connection point, such as connection 115a and connection 115b. Fiberglass rod 110, made from several sections of smaller fiberglass rods connected together, may include a hook 120 or other instrument that allows a user, such as a plumber, to manipulate an air bladder 125 within pipe 105. In the example of FIG. 1, pipe 105 has suffered a failure that requires repair, such as a crack or a hole developed from corrosion, or the like. Thus, air bladder 125 may be fitted with a patch 130, which may be any patch type known in the art. Exemplary patches may be fiberglass infused with epoxy resin and hardener, joint sealing compound, rubber, or any other type of patch material. Patch 130 may be placed by first manipulating fiberglass rod 110 into pipe 105 at the location of the failure such that patch 130 is positioned immediately proximate to the failure. Next, the user may inflate air bladder 125 via air hose 135, another hose that is separate and distinct from fiberglass rod 110. As air bladder 125 is inflated, air bladder 125 pushes patch 130 onto the failure and may be used to secure patch 130 in place, as necessary, as patch 130 cures. Air bladder 125 may also be treated with a release agent which allows the user to deflate the bladder, after patch 130 has cured and set, which allows the user to withdraw air bladder 125, through pipe 105.

As shown in FIG. 1, pipe 105 includes a 90° bend 140, which may also be referred to as an "elbow" joint in pipe 105. Fittings such as 90° bend 140 are commonly used in all plumbing applications and pose significant problems for repairing a failure in a pipe. As shown, fiberglass rod 110 may be inserted in the X direction, as shown in FIG. 1 up to the point of 90° bend 140. Because of 90° bend 140, fiberglass rod 110 is forced around the bend to proceed in a Y direction within pipe 105. Thus, in order to push fiberglass rod 110 further down pipe 105 a user must push in the X direction in order to push bladder 125 in the Y direction. This force creates substantial tensional stress on fiberglass rod 110, most especially around connection joints between the sections of fiberglass rod 110, such as connection 115a.

Frequently, this tensional stress results in fiberglass rod 110 shearing, cracking, or otherwise breaking just forward or behind connection point 115a, for example, because fiberglass rod 110 is far less flexible at connection points, such as connection 115a, than at other points along fiberglass rod 110. These failure points are identified as approximate failure areas 145a and 145b. Once fiberglass rod 110 breaks at approximate failure areas 145a and 145b, it may be difficult to retrieve a broken section of fiberglass rod 110 and bladder 125. Frequently, air line 135 may be used to retrieve the broken section of fiberglass rod 110, although because air line 135 is not specifically designed for this purpose, air line 135 may detach from bladder 125, leaving both bladder 125 and fiberglass rod 110 stuck within pipe 105. Thus, not only is the repair not completed, the problem is compounded by a length of broken fiberglass rod 110 and bladder 125 being stuck within pipe 105. Fiberglass rod 110 is typically inflexible around connection points, such as connection 115a to bend with pipe 105 such that fiberglass rod 110 is a last repair option, for many plumbers, due to the risk of the rod breaking during a repair attempt. Thus, fiberglass rod 110 is a less ideal solution to apply a patch to the inside of pipe 105.

FIG. 2 illustrates a connection joint 200, such as connection 115a of fiberglass rod 110, shown in FIG. 1. Connection joint 200 includes a first section of fiberglass rod 205, including a male threaded end 210, and a second section of fiberglass rod including a female threaded end 215. First section of fiberglass rod 205 may be threaded, by male threaded end 210, into second section of fiberglass rod 220, by female threaded end 215. In this manner, many different fiberglass rods may be fitted together to create a fiberglass rod, such as fiberglass rod 110 shown in FIG. 1, of any length. While there is no inherent problem with the approach of threading a first section of fiberglass rod 205 into a second section of fiberglass rod 220 to create a fiberglass rod of a desired length, the fiberglass, nylon, or other synthetic and natural materials that may be used, lack the flexibility to successfully navigate piping without breaking and creating additional problems using screw together threaded type fittings.

Accordingly, a need exists for, and it is at least one object of this disclosure to provide, a system which allows a user to reliably insert a push rod into a pipe and inflate a bladder. Further, another object of this disclosure is to provide a device which allows a push rod to include joints, as necessary, with sufficient flexibility to negotiate various fittings in piping is needed. Finally, it is an object of this disclosure to provide a device which eliminates a need for multiple lines, such as air lines, to be inserted into a pipe with a push rod to execute a bladder based patch of piping.

SUMMARY

Disclosed herein is a device. The device includes a length of pipe. The length of pipe may include a first fitting connecting, by a first connection, to a first end of the pipe. The length of pipe may further include a second fitting connecting, by a second connection, to a second end of the pipe. The first connection and the second connection are air-tight.

Further disclosed herein is a system. The system includes a length of pipe. The system further includes a first fitting connecting at a first end of the pipe at a first connection. The system further includes a second fitting connecting a second end of the pipe at a second connection. The system also includes an air bladder connected to the second end of the pipe. The first connection and the second connection are air tight.

BRIEF DESCRIPTION OF THE DRAWINGS

The accompanying drawings illustrate various embodiments of a pressurized push rod device and system.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate the techniques and embodiments may also be practiced in other similar devices.

Reference is now made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may alternatively be included in another embodiment or figure regardless of whether or not those elements are shown or described in another embodiment or figure. In other words, elements in the figures may be interchangeable between various embodiments disclosed herein, whether shown or not.

Figure 3:
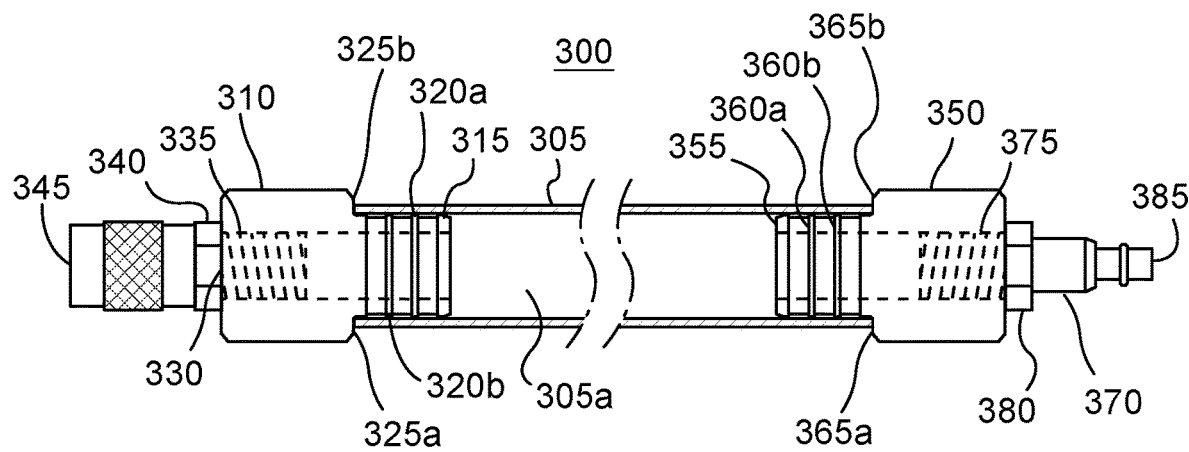
FIG. 3 illustrates a pressurized push rod device.

FIG. 3 illustrates a pressurized push rod device 300. Pressurized push rod device 300 includes a cylindrical hose, tube, or pipe 305, having a void 305a with an internal diameter disposed therein. In one embodiment, pipe 305 may be implemented as an HDPE (High Density Polyethylene) plastic pipe capable of maintaining an internal pressure of up to approximately 128 pounds per square inch of pressure in a substantially 1" internal diameter pipe. Other materials may be used to construct pipe 305, such as various other types of plastics, including poly-paraphenylene terephthalamide, nylon, twaron, thermoplastics, polyamides, and other similar materials. One advantage of such materials is that these materials are flexible over a given length of piping while still being rigid enough to push and pull through a pipe, such as a sewer pipe. For example, while the term flexible may be broadly interpreted, an example of flexible pipe may be defined as pipe that may be deflected by more than or equal to 3 inches per foot of pipe. That is, a flexible pipe may be bent by 3 inches per foot of pipe before breaking, kinking, splitting, or interrupting a void 305a within pipe 305. However, at the same time, a flexible pipe, to be considered rigid enough to be pushed and pulled through a pipe may be deflected by less than 9 inches per foot of pipe before breaking, kinking, splitting, or interrupting a void 305a within the pipe. Thus, in a preferable embodiment, pipe 305 may be constructed from materials that may be deflected or bent anywhere between 3 and 9 inches per foot of pipe. In this manner, pipe 305 may be implemented using any of the foregoing materials. Flexibility of pipe 305 is necessary to allow pipe 305 to move through various fittings within piping, such as sewer piping, without kinking, breaking, splitting or interrupting the void 305a within pipe 305.

Pipe 305 may also be implemented in any length. For example, pipe 305 may be implemented in ten or twenty or twenty five foot lengths to meet the requirements of a particular situation. Shorter lengths of pipe 305 may be desirable as pipe 305 may be connected to another length of pipe to lengthen pipe 305, while at the same time increasing portability of pipe 305. However, a length of pipe 305 is generally irrelevant for the purposes of disclosure.

Pipe 305 may be terminated on a first end by a first fitting 310. First fitting 310 may be implemented using hard plastics or, more preferably, a metal such as brass, bronze, aluminum, steel, or other similar or suitable material. First fitting 310 may include a hose barb 315 which prevents first fitting 310 from being removed from pipe 305. For example, hose barb 315 may include a surface that is parallel to a horizontal (around the circumference) cross section of pipe 305 which has a diameter slightly larger (on the order than of less than a millimeter) than an internal diameter of pipe 305 and which digs into or seats into material around the internal diameter of pipe 305. When hose barb 315 digs into or seats into the material around the internal diameter of pipe 305, not only is a seal formed between first fitting 310 and pipe 305, but hose barb 315 also prevents first fitting 310 from being removed from pipe 305 without destroying pipe 305.

First fitting 310 further includes crimp retainer 320a and crimp retainer 320b. Crimp retainer 320a and crimp retainer 320b are spaced to accommodate a standard crimp ring to be installed on an outside surface of pipe 305 but also between crimp retainer 320a and crimp retainer 320b to provide an air tight seal between first fitting 310 and pipe 305. First fitting 310 further includes shoulder 325a and shoulder 325b, which may be implemented as separate shoulders or may be concentric and circumferential around first fitting 310. Shoulder 325a and shoulder 325b, whether implemented as separate shoulders or a concentric and circumferential ring may be larger in diameter than an outside diameter of pipe 305. In this manner, first fitting 310 may be seated within pipe 305 by inserting first fitting 310 into pipe 305 to the point where pipe 305 comes into contact with shoulder 325a and shoulder 325b (or with the concentric circumferential ring defined by shoulder 325a and shoulder 325b). The term concentric may be interpreted as referring to a relative size of shoulder 325a and shoulder 325b being larger than an outside diameter of pipe 305 while the term circumferential refers to the concentric shoulder 325a and shoulder 325b extending around a horizontal (around a circumferential) cross section of first fitting 310 such that shoulder 325a and shoulder 325b acts as a stop for inserting first fitting 310 into pipe 305.

First fitting 310 may include a void 330, which allows air to pass through first fitting 310 into pipe 305. Void 330, which is disposed within first fitting 310, may include threads 335, which allow first fitting 310 to attach to another pipe or to an air compressor fitting, such as air compressor fitting 340 directly or via another threaded fitting 345. In this manner, pipe 305 may receive compressed air from an air compressor.

Pipe 305 may be terminated on a second end by a second fitting 350. Second fitting 350 may be substantially identical in construction to first fitting 310. For example, second fitting 350 may be implemented using hard plastics or, more preferably, a metal such as brass, bronze, aluminum, steel, or other similar or suitable material. Second fitting 350 may further include a hose barb 355 which prevents second fitting 350 from being removed from pipe 305. For example, hose barb 355 may include a surface that is parallel to a horizontal cross section of pipe 305 which has a diameter slightly larger (on the order than of less than a millimeter) than an internal diameter of pipe 305 which digs into or seats into material around the internal diameter of pipe 305. When hose barb 355 digs into or seats into the material around the internal diameter of pipe 305, not only is an air tight seal formed between second fitting 350 and pipe 305, but hose barb 355 prevents second fitting 350 from being removed from pipe 305 without destroying pipe 305.

Second fitting 350 further includes crimp retainer 360a and crimp retainer 360b. Crimp retainer 360a and crimp retainer 360b are spaced to accommodate a standard crimp ring to be installed on an outside surface of pipe 305 but also between crimp retainer 360a and crimp retainer 360b to provide an air tight seal between second fitting 350 and pipe 305. Second fitting 350 further includes shoulder 365a and shoulder 365b, which may be implemented as separate shoulders or may be concentric and circumferential around second fitting 350. Shoulder 365a and shoulder 365b, whether implemented as separate shoulders or a concentric and circumferential ring may be larger in diameter than an outside diameter of pipe 305. In this manner, second fitting 350 may be seated within pipe 305 by inserting second fitting 350 into pipe 305 to the point where pipe 305 comes into contact with shoulder 365a and shoulder 365b (or with the concentric circumferential ring defined by shoulder 365a and shoulder 365b). Again, the term concentric may be interpreted as referring to a relative size of shoulder 365a and shoulder 365b being larger than an outside diameter of pipe 305 while the term circumferential refers to the concentric shoulder 365a and shoulder 365b extending around a horizontal cross section of second fitting 350 such that shoulder 365a and shoulder 365b act as a stop for inserting second fitting 350 into pipe 305.

Second fitting 350 may include a void 370, which allows air to pass through second fitting 350 into an air bladder. Void 370, which is disposed within second fitting 350, may include threads 375, which allow second fitting 350 to attach to another pipe or to an air bladder fitting, such as air bladder fitting 380 directly or via another threaded fitting 385. In this manner, an air bladder (which is discussed below) may be attached to pipe 305 and receive air from an air compressor via pipe 305. As air is applied within pipe 305, air may pass through first fitting 310 into pipe 305, from pipe 305 through second fitting 350, and into an air bladder. In most situations, as will be discussed below, an air bladder may be fully inflated at approximately 30 PSI of pressure. Thus, while pipe 305 may safely contain a much higher pressure without rupturing, pipe 305 may be pressurized to approximately 30 PSI of pressure with the compressed air to fully inflate an air bladder. However, it is noted that air, while preferable, is not the only material with which pipe 305 may be pressurized. Other fluids, such as water or hydraulic fluid, for example, may be used to inflate an air bladder. Thus, pipe 305, including first fitting 310 and second fitting 350 serves as pressurized push rod device 300.

Figure 4:
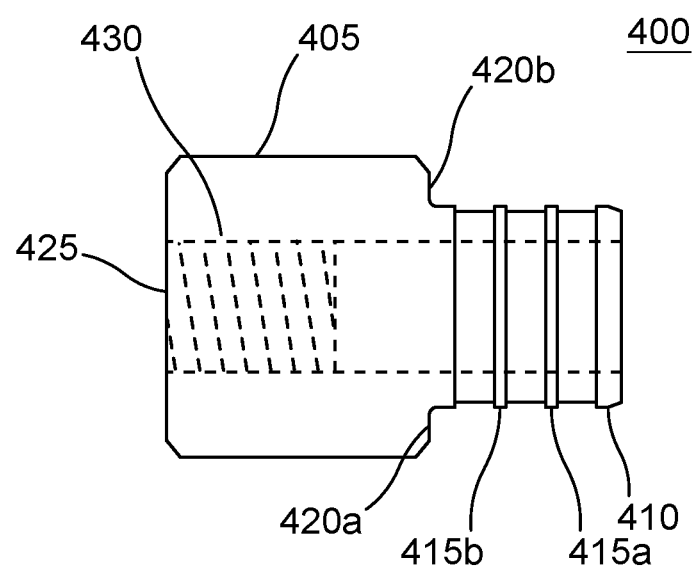
FIG. 4 illustrates an exemplary air fitting for terminating the pressurized push rod device shown in FIG. 3.

FIG. 4 illustrates an exemplary air fitting 400 for terminating a pressurized push rod device, such as pressurized push rod device 300, shown in FIG. 3. Indeed, fitting 400 may be similar in both implementation and description to first fitting 310 and second fitting 350, shown in FIG. 3.

Fitting 400 may be implemented using hard plastics or, more preferably, a metal such as brass, bronze, aluminum, steel, or other similar or suitable material. Fitting 400 may further include a hose barb 410 which prevents fitting 400 from being removed from a pipe, such as pipe 305, shown in FIG. 3. For example, hose barb 410 may include a surface that is parallel to a horizontal cross section of pipe 305 which has a diameter slightly larger (on the order than of less than a millimeter) than an internal diameter of pipe 305 which digs into or seats into material around the internal diameter of pipe 305.

Fitting 400 further includes crimp retainer 415a and crimp retainer 415b. Crimp retainer 415a and crimp retainer 415b are spaced to accommodate a standard crimp ring to be installed between crimp retainer 415a and crimp retainer 415b to provide an air tight seal between fitting 400 and pipe 305. Fitting 400 further includes shoulder 420a and shoulder 420b, which may be implemented as separate shoulders or may be concentric and circumferential around fitting 400. Shoulder 420a and shoulder 420b, whether implemented as separate shoulders or a concentric and circumferential ring may be larger in diameter than an outside diameter of pipe 305. In this manner, fitting 400 may be seated within pipe 305 by inserting fitting 400 into pipe 305 to the point where pipe 305 comes into contact with shoulder 420a and shoulder 420b (or with the concentric circumferential ring defined by shoulder 420a and shoulder 420b). Again, the term concentric may be interpreted as referring to a relative size of shoulder 420a and shoulder 420b being larger than an outside diameter of pipe 305 while the term circumferential refers to the concentric shoulder 420a and shoulder 420b extending around a horizontal cross section of fitting 400 such that shoulder 420a and shoulder 420b acts as a stop for inserting fitting 400 into pipe 305.

Fitting 400 may include a void 425, which allows air to pass through first fitting 400 into pipe 305. Void 425, which is disposed within fitting 400, may include threads 430, which allow fitting 400 to attach to another pipe, an air compressor fitting, or a bladder fitting.

Figure 1:
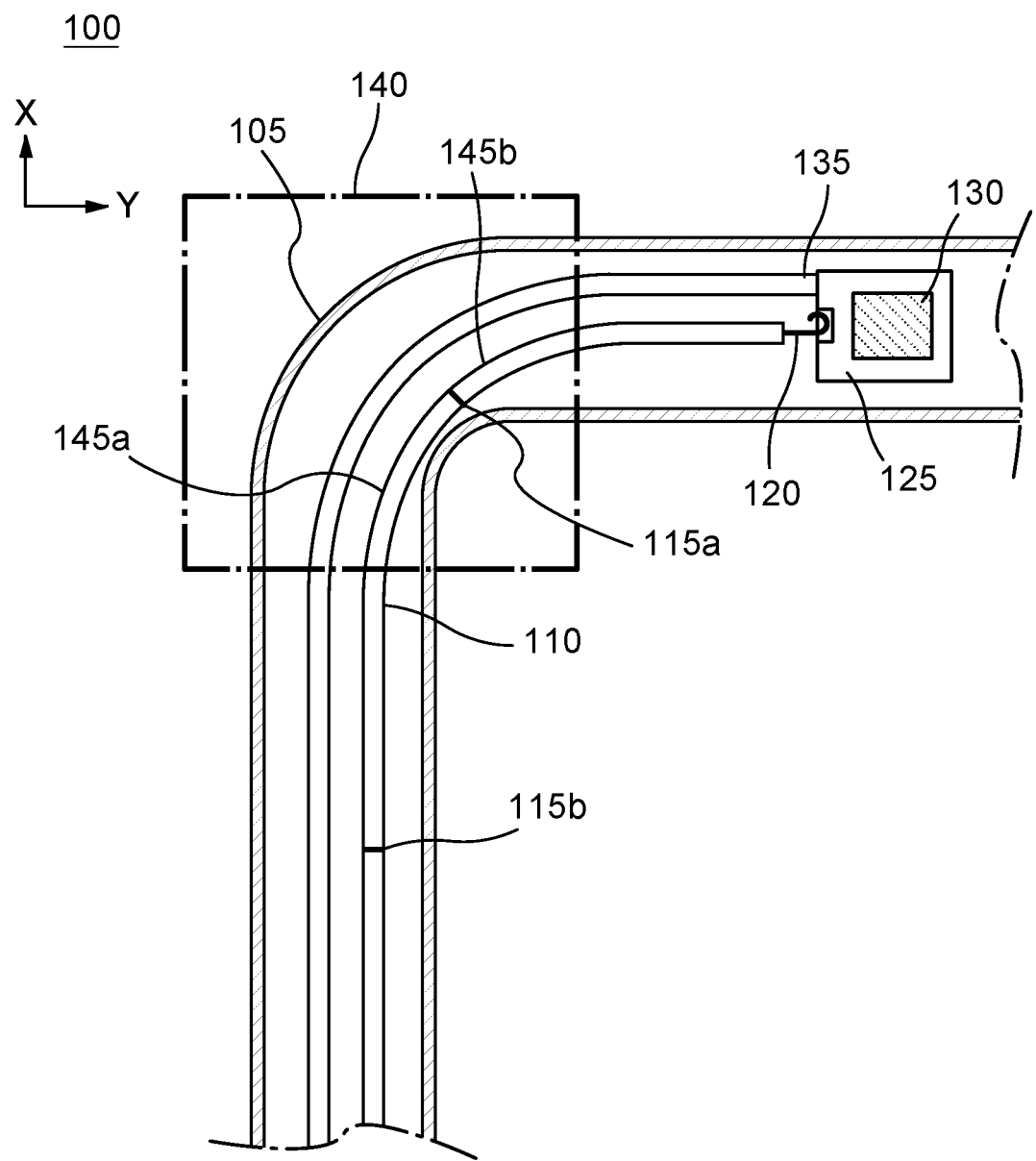
FIG. 1 illustrates prior art solution to making a bladder based patch on an inside surface of a pipe.
Figure 2:
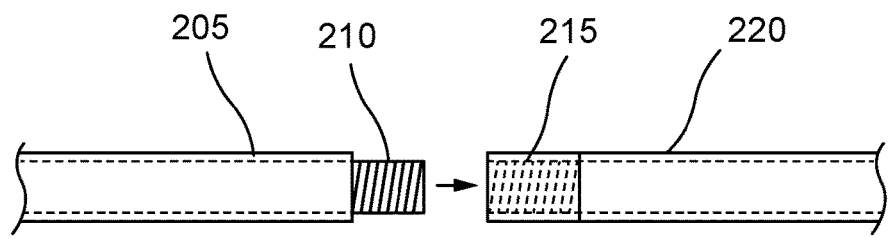
FIG. 2 illustrates a prior art fiberglass rod used to position the bladder, as shown in FIG. 1.
Figure 5:
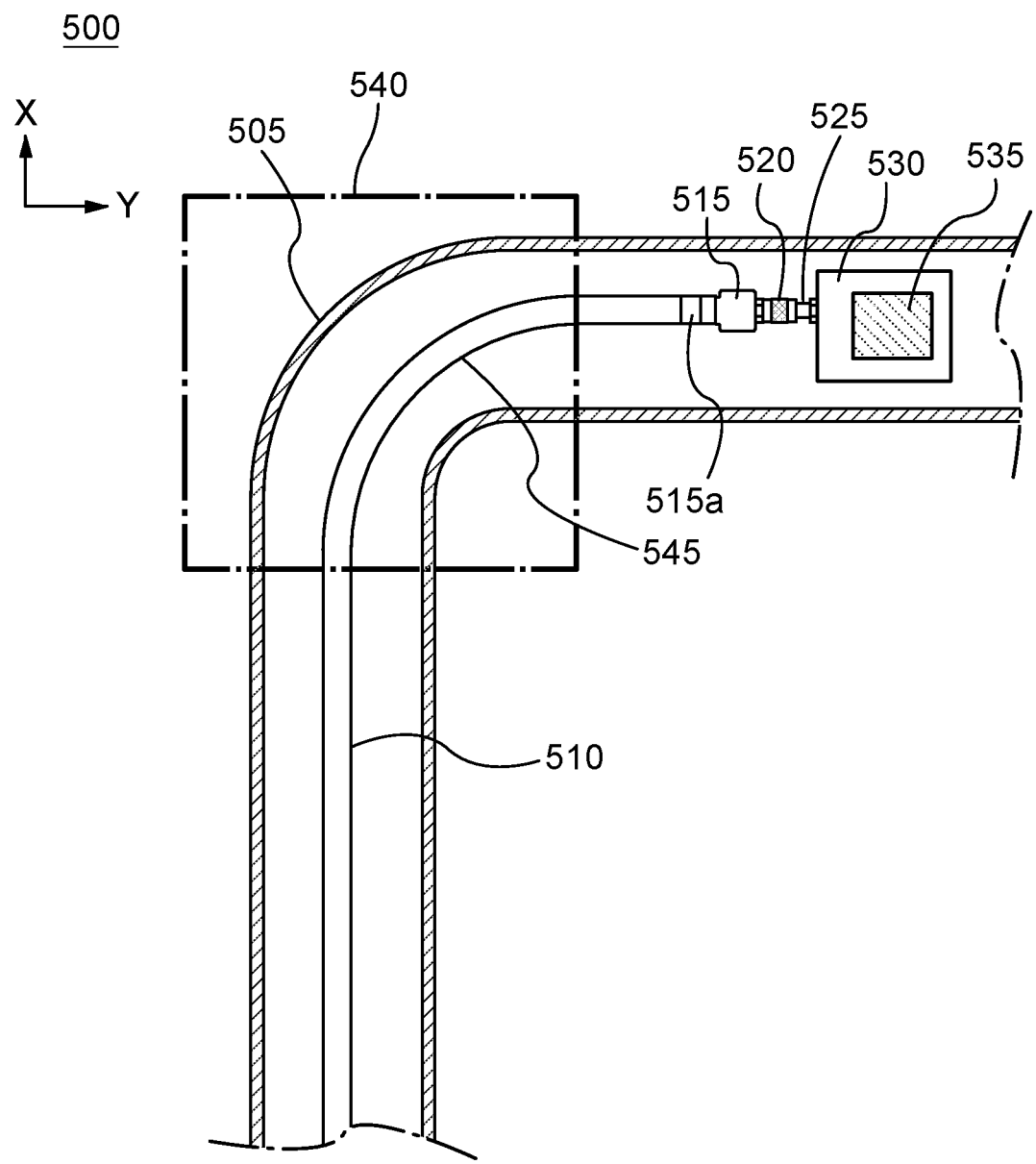
FIG. 5 illustrates a pressurized push rod system for making a bladder based patch on an inside surface of a pipe.

FIG. 5 illustrates a pressurized push rod system 500 for making a bladder based patch on an inside surface of a pipe 505. FIG. 5 illustrates a pressurized push rod system 500 in an environment that is similar to that shown in FIG. 1. As discussed in FIG. 1, pipe 505 has suffered a failure that requires repair, such as a crack or a hole developed from corrosion, or the like. For example, pipe 505 may be a conventional sewer pipe of any conventional diameter. Disposed within pipe 505 is a pressurized push rod device 510, which is similar in implementation and description to pressurized push rod device 300, shown in FIG. 3. As shown in FIG. 5, pressurized push rod device 300 is continuous without connection points, which is preferred.

However, it is possible that one or more connection points (not shown) may be necessary to connect one section of pressurized pushrod device 510 to another section of pressurized push rod device 510 to extend a length of pressurized push rod device 510. Advantageously, however, sewer pipes in particular generally have a large enough interior diameter that any connections between pipes using the various fittings disclosed herein are durable to the point where they can withstand the stresses of working through, or being pushed past, pipe fittings, such as elbows, 45° bends, and other pipe fittings, without breaking. Further, since the piping used in pressurized push rod device 510 is relatively flexible while still being relatively rigid, the flexibility of the piping reduces the tensional stresses placed on connection points between different sections of pressurized push rod device 510.

Pressurized push rod system 500 may include a fitting 515, which may be similar in implementation and description to second fitting 350 shown in FIG. 3 and fitting 400 shown in FIG. 4. As shown in FIG. 5, fitting 515 may be secured in place by a crimp 515a, which is disposed between crimp retainer 415a and 415b, shown in FIG. 4 around an outside diameter of pressurized push rod device 510 to secure fitting 515 to pressurized push rod device 510 in an air tight manner.

Fitting 515 may connect directly to an air bladder fitting 525 or indirectly via an optional adapter 520, depending on how an air bladder 530 is implemented. It is also conceivable that an air bladder 530 may be positioned at an end of pressurized push rod device 510 as an integral element of pressurized push rod device 510 (i.e., in place of or without air bladder fitting 525). In this example, air bladder 530 may include an air bladder fitting 525 which mates with fitting 515 or may require an adapter 520 to mate with fitting 515.

Air bladder 530 may be treated with a patch 535 for damaged portion of pipe 505.

Pipe 505 includes a 90° bend 540, which may also be referred to as an "elbow joint" in pipe 505. Fittings such as 90° bend 540 are frequently used in plumbing applications and create substantial hardship in repairing a failure in a pipe. Pressurized push rod device 510 may be inserted in the X direction, as shown in FIG. 5 up to the point of 90° bend 540. Because of 90° bend 540, pressurized push rod 510 is forced around 90° bend 540 to proceed in a Y direction within pipe 505. Thus, in order to manipulate air bladder 530 to the point of the failure in the pipe, a user must push pressurized rod device 510 in an X direction in order to push air bladder 530 in the Y direction. Tensional stresses created by forcing pressurized push rod device 510 through 90° bend 540 are within tolerance specifications for pressurized push rod device 510, even if a connection point between sections of pressurized push rod device 510 are disposed within 90° bend 540, such that pressurized push rod 510 is undamaged and unharmed during traversal of 90° bend 540.

Thus, a user may manipulate pressurized push rod device 510 to position air bladder 530 such that patch 535 may be applied to a failure in pipe 505. Patch 535 may be any patch type known in the art. Exemplary patches may be fiberglass infused with epoxy resin and hardener, joint sealing compound, rubber, or any other type of patch material. Once patch 535 is positioned immediately proximate to the failure by pressurized push rod device 510, an external air compressor may supply air into pressurized push rod device 510. For example, a fitting, such as first fitting 310, shown in FIG. 3, may connect to an air compressor to allow compressed air into a pipe, such as pipe 305 included in pressurized push rod device 510. Compressed air may pass through pressurized push rod device into air bladder 530 such that both pressurized push rod device 510 and air bladder 530 are internally pressurized to substantially the same pressure (within 5 or less PSI). As air bladder 530 is inflated, air bladder 530 pushes patch 535 onto the failure and may be used to secure patch 535 in place, as necessary, as patch 535 cures. Air bladder 530 may also be treated with a release agent, which allows air bladder 530 to separate from patch 535 once patch 535 is cured and set.

Once patch 535 is sufficiently positioned and applied, a user may deflate air bladder 530 by allowing compressed air disposed within pressurized push rod device 510 and air bladder 530 to depressurize by simply disconnecting pressurized push rod device 510 from an air compressor. Once air bladder 530 is deflated, the user may withdraw pressurized push rod device 510 from pipe 505 without fear of pressurized push rod device breaking and without the use of a separate air line, as previously discussed with respect to FIG. 1, vastly improving the efficiency and user experience of applying a patch to a portion of a pipe which has failed.

The foregoing description is presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device, comprising:
a length of pipe, the length of pipe having a first end and a second end between which the length of pipe has a consistent diameter that is uninterrupted between the first end and the second end and a pipe void which is continuous between the first end and the second end of the length of pipe:
a first fitting connecting, by a first connection, to the first end of the length of pipe, the first fitting including a continuous void extending through a length of the first fitting which allows air to flow from the first fitting and into the length of pipe after a shoulder of the first fitting at which the length of pipe begins, the continuous void of the first fitting including threads formed on an inside wall of the first fitting and inside the continuous void of the first fitting; and
a second fitting connecting by a second connection to the second end of the length of pipe, the second fitting including a continuous void extending through a length of the second fitting which allows air to flow from the length of pipe and into the second fitting before a shoulder of the second fitting at which the length of pipe terminates, the continuous void of the second fitting including threads formed on an inside wall of the second fitting and inside the continuous void of the second fitting,
wherein the continuous void in the first fitting is open on opposing sides of the first fitting and unobstructed through the first fitting and the continuous void in the second fitting is open on opposing sides of the second fitting and unobstructed through the second fitting; and
wherein the first connection and the second connection are air tight to allow pressurization of the pipe, the pressurization of the pipe causing inflation of an air bladder, and when the pipe is pressurized, the pipe is a push rod for the air bladder, the air bladder including a patch positioned on the air bladder, and
wherein the push rod is capable of positioning the air bladder in a pipe to place the patch in the pipe to repair damage in the pipe.

2. The device of claim 1, wherein the first fitting receives compressed air and conveys the compressed air into the pipe.

3. The device of claim 1, wherein the second fitting conveys air in the pipe into to an air bladder.

4. The device of claim 1, wherein the first fitting includes a barb.

5. The device of claim 4, wherein the first fitting includes a first crimp retainer and a second crimp retainer.

6. The device of claim 1, wherein the second fitting includes a barb.

7. The device of claim 6, wherein the second fitting includes a first crimp retainer and a second crimp retainer.

8. The device of claim 1, wherein the length of pipe deflects between 3 and 9 inches per foot of pipe before interrupting the pipe void by breaking, kinking, or splitting.

9. A system, comprising:
a length of pipe, the length of pipe having a first end and a second end between which the length of pipe has a constant diameter and a pipe void that is uninterrupted between the first end and the second end of the length of pipe;
a first fitting connecting to the first end of the length of pipe at a first connection, the first fitting including a continuous void extending through a length of the first fitting which allows air to flow from the first fitting and into the length of pipe after a shoulder of the first fitting at which the length of pipe begins the continuous void of the first fitting including threads formed on an inside wall of the first fitting and inside the continuous void of the first fitting;
a second fitting connecting the second end of the length of pipe at a second connection, the second fitting including a continuous void extending through a length of the second fitting which allows air to flow from the length of pipe and into the second fitting before a shoulder of the second fitting at which the length of pipe terminates, the continuous void of the second fitting including threads formed on an inside wall of the second fitting and inside the continuous void of the second fitting; and
an inflatable air bladder, the air bladder including a patch positioned on the air bladder;
wherein the continuous void in the first fitting is open on opposing sides of the first fitting and unobstructed through the first fitting and the continuous void in the second fitting is open on opposing sides of the second fitting and unobstructed through the second fitting which allow air to pass into the inflatable air bladder;
wherein the first connection and the second connection are air tight to allow pressurization of the pipe, the pressurization of the pipe causing inflation of the air bladder, and when the pipe is pressurized, the pipe is a push rod for the air bladder; and wherein the push rod is capable of positioning the air bladder in a pipe to place the patch in the pipe to repair damage in the pipe.

10. The system of claim 9, wherein the first fitting receives compressed air and conveys the compressed air into the pipe.

11. The system of claim 10, wherein the second fitting conveys compressed air in the pipe into the inflatable air bladder.

12. The system of claim 9, wherein a fluid or a gas is conveyed from the first end of the pipe to the inflatable air bladder.

13. The system of claim 12, wherein the fluid or the gas conveyed from the first end of the pipe to the inflatable air bladder inflates the inflatable air bladder.

14. The system of claim 9, wherein the first fitting includes an air compressor fitting.

* * * * *